(12) United States Patent
Tsiatsikas et al.

(10) Patent No.: US 11,843,974 B2
(45) Date of Patent: Dec. 12, 2023

(54) COMPUTER-IMPLEMENTED METHOD OF PROCESSING AN EMERGENCY INCIDENT AND EMERGENCY COMMUNICATION NETWORK

(71) Applicant: Unify Patente GmbH & Co. KG, Munich (DE)

(72) Inventors: Zisis Tsiatsikas, Salonika (GR); Sofia Anagnostou, Athens (GR)

(73) Assignee: ATOS PUBLIC SAFETY LLC, Irving, TX (US)

( * ) Notice: Subject to any disclaimer, the term of this patent is extended or adjusted under 35 U.S.C. 154(b) by 13 days.

(21) Appl. No.: 17/536,221

(22) Filed: Nov. 29, 2021

(65) Prior Publication Data
US 2022/0174549 A1    Jun. 2, 2022

(30) Foreign Application Priority Data
Nov. 30, 2020 (EP) .................................. 20210719

(51) Int. Cl.
| | | |
|---|---|---|
| *H04W 28/20* | (2009.01) | |
| *H04W 4/90* | (2018.01) | |
| *H04M 3/436* | (2006.01) | |
| *H04M 3/51* | (2006.01) | |
| *H04M 7/00* | (2006.01) | |
| *H04N 7/14* | (2006.01) | |

(Continued)

(52) U.S. Cl.
CPC .......... *H04W 28/20* (2013.01); *H04M 3/436* (2013.01); *H04M 3/5116* (2013.01); *H04M 7/0039* (2013.01); *H04N 7/147* (2013.01); *H04W 4/025* (2013.01); *H04W 4/90* (2018.02); *G06N 20/00* (2019.01)

(58) Field of Classification Search
None
See application file for complete search history.

(56) References Cited

U.S. PATENT DOCUMENTS

| | | | | |
|---|---|---|---|---|
| 2007/0024705 | A1* | 2/2007 | Richter | .............. H04N 21/6587 348/E7.086 |
| 2008/0037762 | A1* | 2/2008 | Shaffer | .............. H04M 3/42187 379/265.09 |

(Continued)

FOREIGN PATENT DOCUMENTS

JP    2009130673    6/2009

OTHER PUBLICATIONS

European Search Report for European Application No. 20210719.9 dated May 26, 2021.

*Primary Examiner* — Stella L. Woo

(57) ABSTRACT

A method of processing an emergency incident reported to a PSAP by a plurality of callers can include checking, at the PSAP, if video calls have been received from the same specified location within a predetermined time period, and if it is determined that there are such further video calls, feeding at least a part of the video call and the further video calls to a ML classifier unit. The ML Classifier unit can identify if there are similarities between the video call and the further video calls. If there exists similarity between the video call and at least one further video call, a determination about which one of the video calls t uses less resources (e.g. less bandwidth). That video call can then be utilized and other similar calls can be adjusted to reduce the bandwidth further (e.g. converted to audio calls, etc.).

19 Claims, 4 Drawing Sheets

(51) Int. Cl.
*H04W 4/02* (2018.01)
*G06N 20/00* (2019.01)

(56) References Cited

U.S. PATENT DOCUMENTS

| | | |
|---|---|---|
| 2011/0069625 A1 | 3/2011 | Michaelis et al. |
| 2015/0029295 A1* | 1/2015 | Gupta .................... H04N 7/147 |
| | | 348/14.01 |
| 2020/0059776 A1* | 2/2020 | Martin ................ G06F 3/04817 |
| 2020/0162880 A1 | 5/2020 | Patton et al. |
| 2020/0351403 A1* | 11/2020 | George ............... H04M 3/5233 |

* cited by examiner

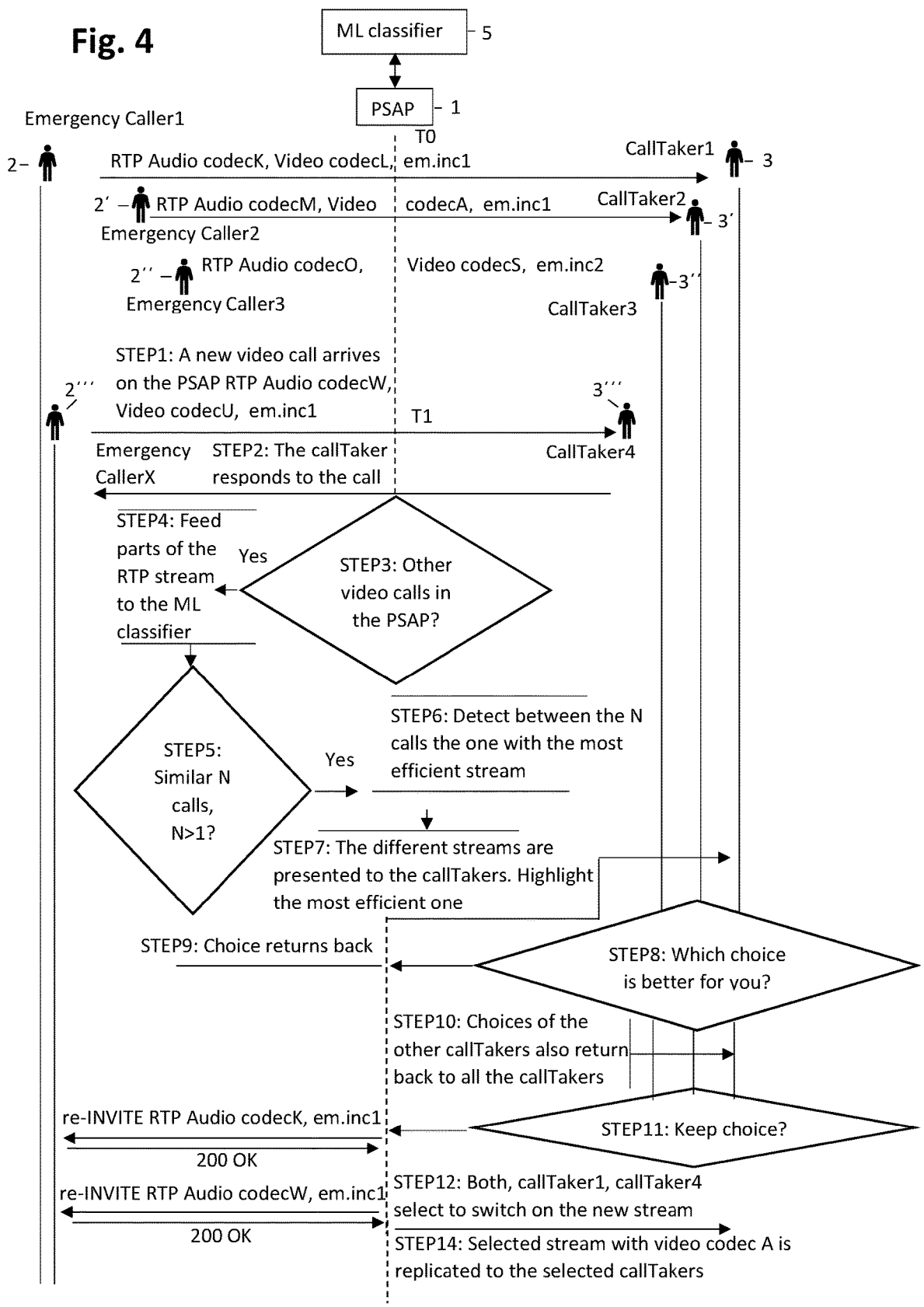

COMPUTER-IMPLEMENTED METHOD OF PROCESSING AN EMERGENCY INCIDENT AND EMERGENCY COMMUNICATION NETWORK

CROSS-REFERENCE TO RELATED APPLICATION

The present application claims priority to European Patent Application No. EP 20 210 719.9, which was filed on Nov. 30, 2020. The entirety of this European Patent Application is incorporated by reference herein.

FIELD

The present invention relates to a computer-implemented method of processing an emergency incident and a corresponding emergency communication network and telecommunication device.

BACKGROUND

A public-safety answering point, PSAP, is a call center where emergency calls initiated by any mobile or landline subscriber are handled. However, during the handling of a plurality of emergency calls received basically at the same time for an emergency incident, the PSAP may be subject to an increased load. Amongst others, this may be caused by receiving not only audio calls, but also emergency calls containing resource consuming video streams.

SUMMARY

We have determined that a further problem may arise in that the calls may be initiated using different codecs, and therefore, the streaming requirements for these calls could overload the resources of the PSAP. Embodiments of the present invention can be configured to be based on the object to provide a resource-saving and efficient computer-implemented method of processing an emergency incident and a corresponding emergency communication network.

A computer-implemented method of processing an emergency incident reported to a PSAP by a plurality of callers is provided that can include:
  receiving, at the PSAP, a video call for reporting an emergency incident at a specified location;
  checking, at the PSAP, if further video calls have been received from the same specified location within a predetermined time period, and if it is determined that there are further video calls that have been received at the PSAP for the same specified location within the predetermined time period, feeding at least a part of the video call and the further video calls to a ML classifier unit,
  identifying, at the ML classifier unit, if there are similarities between the video call and the further video calls, and if it is determined that there exists similarity between the video call and at least one further video call,
  determining which one of the video calls that have been determined to be similar uses less resources, in particular, less bandwidth.

According to a preferred embodiment, the video call and the further video calls can use different audio and/or video codec.

According to another preferred embodiment, the video stream that has been determined to use less resources is transmitted to at least one call taker that handles the emergency incident at the PSAP, and is displayed at a display unit of the at least one call taker.

According to still another preferred embodiment, the method can also include providing, to the at least one call taker that handles the emergency incident at the PSAP, a button for selecting a video stream to be used for further handling the emergency incident.

Preferably, the method also includes presenting the selection of the at least one call taker that handles the emergency incident at the PSAP to other call takers at the PSAP that handle the emergency incident.

Moreover, the method may also include generating at least one re-INVITE message to the emergency callers of the plurality of the emergency callers who select to switch from video call to audio call.

According to still another preferred embodiment, the method can include converting video calls to audio calls, if the respective emergency caller has selected to switch from video call to audio call.

Preferably, the method also includes replicating the selected video stream to all call takers at the PSAP that handle the emergency incident.

Further, an emergency communication network can be provided. The network can include at least one PSAP for handling at least one emergency incident according to an embodiment of the computer-implemented method for handling an emergency incident. The PSAP can be a computer device or telecommunication system that includes a processor connected to non-transitory memory and at least one transceiver. The memory can include code that can be run by the processor so that the PSAP can implement an embodiment of the method.

According to yet another preferred embodiment of the invention, the PSAP can include a ML classifier unit that is able to use a stream replication technique for determining similarity between the video streams.

In some embodiments, if it is determined that there are several video calls reporting the same emergency incident, then the video stream that has the least bandwidth requirements is determined and presented to a call taker at the PSAP who handles the emergency incident so that he or she may select which one is more efficient to use. If the video stream that uses the least bandwidth is sufficient for handling the emergency incident, then the other video streams that relate to the same emergency incident may be switched to simple audio calls, thereby saving resources, in particular, in terms of bandwidth usage.

Other details, objects, and advantages of the telecommunications apparatus, system, device, non-transitory computer readable medium, and method will become apparent as the following description of certain exemplary embodiments thereof proceeds.

BRIEF DESCRIPTION OF THE DRAWINGS

The invention and embodiments thereof will be described below in further detail in connection with the drawings. It should be appreciated that like reference numbers can identify similar components.

FIG. 4 shows an end-to-end scenario according to still another embodiment of the invention.

Figure 1:
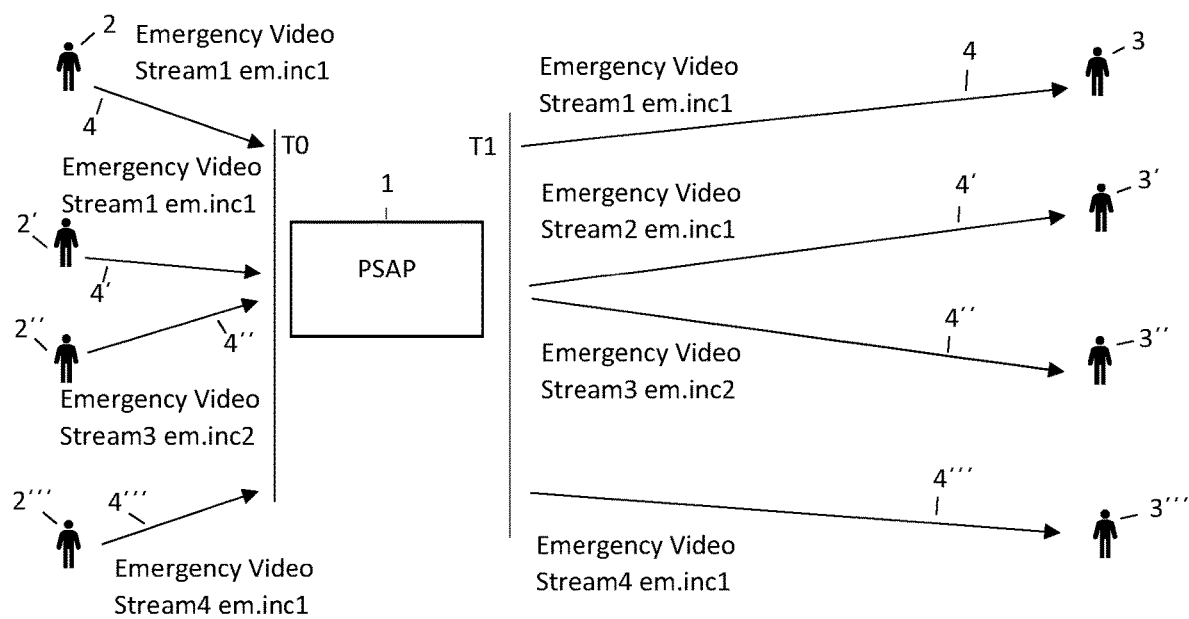
FIG. 1 schematically shows a scenario at a PSAP receiving and processing an emergency incident according to prior art.

Reference characters used in the drawings include:
1 PSAP;
2, 2', 2", 2''' emergency caller;
3, 3', 3", 3''' call taker or agent;
4, 4', 4", 4''' video stream; and
5 Machine Learning (ML) Classifier

DETAILED DESCRIPTION

FIG. 1 schematically shows a scenario at a PSAP 1 receiving and processing an emergency incident according to prior art. It should be appreciated that the PSAP 1 can be a telecommunication system that includes a processor connected to a non-transitory computer readable medium (e.g. memory) and at least one transceiver. In the scenario illustrated here, there are exemplarily shown four emergency callers 2, 2', 2", 2''' who respectively report the same emergency event or emergency incident by means of video, the video streams 4, 4', 4", 4''' being transmitted to the PSAP 1 and from there being distributed to respective call takers or agents 3, 3', 3", 3''' within a predetermined period of time, namely, for a point of time T0 to a point of time T1. According to this scenario, every call or video stream 4, 4', 4", 4''' received at the PSAP 1 is transmitted to an individual call taker 3, 3', 3" 3,'''. For example, the video-based emergency call initiated by the caller 2 is transmitted as emergency video stream em.inc1 indicated by reference numeral 4 via the PSAP 1 to the call taker 3 who will process the information received and handle the emergency call. Another call taker 3' will handle the emergency video stream2 em.inc1 indicated by reference numeral 4', a further call taker 3" will handle the emergency video stream 3 em.inc1 indicated by reference numeral 4", and yet a further call taker 3''' will handle the video stream 4 em.inc1 indicated by reference numeral 4'''. As can be seen, a lot of resources are used within the time period T0 to T1. Specifically, a lot of bandwidth is used by the plurality of video streams, although for reporting the emergency incident, it would be sufficient to simply transmit only one video stream for handling it.

Figure 2:
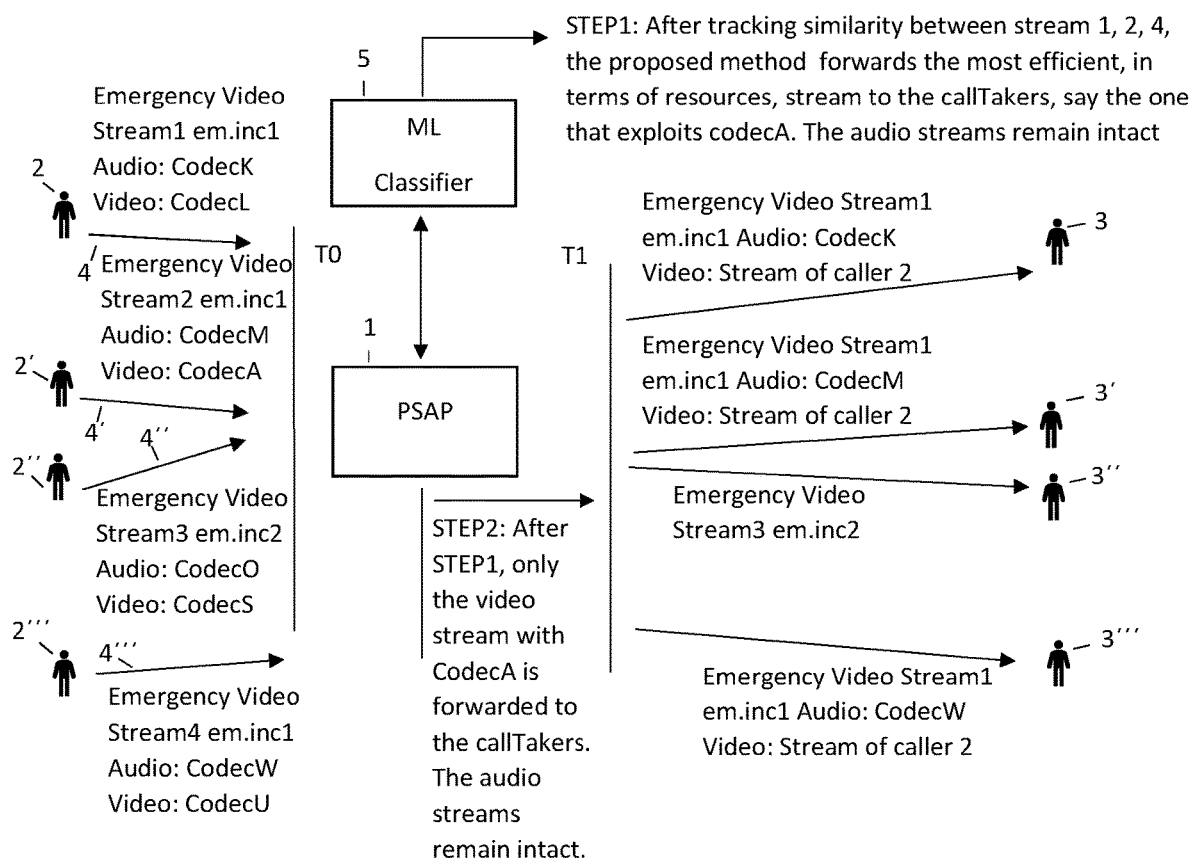
FIG. 2 schematically shows another scenario at a PSAP receiving and processing an emergency incident according to an embodiment of the invention.

FIG. 2 schematically shows another scenario at a PSAP 1 receiving and processing an emergency incident according to an embodiment of the invention. Again, exemplarily, there are four single callers 2, 2', 2", 2''' who respectively report the same emergency incident by using video so that four different video streams, namely, emergency video stream1 em.inc1 indicated by reference numeral 4, which comprises CodecK for audio and CodecL for video, emergency video stream2 em.inc1 indicated by reference numeral 4', which comprises CodecM for audio and CodecA for video, emergency video stream3 em.inc2 indicated by reference numeral 4", which comprises CodecO for audio and CodecS for video, and emergency video stream4 em.inc1 indicated by reference numeral 4''', which comprises CodecW for audio and CodecU for video. It should be appreciated the callers can provide the video streams via telecommunication terminal devices (e.g. smart phones, etc.), which can each include at least one camera, memory, and at least one transceiver connected to a processor.

All four video streams 4, 4', 4", 4''' are received at the PSAP 1 where they are first transmitted to a Machine Learning, ML, classifier 5. Here, a stream replication technique is applied the main features of which are basically known from prior art. However, according to the embodiment illustrated here, the difference compared to prior art techniques is that the streams are compared in order to track which ones of them relate to the same emergency incident. That is, assuming there have been received four active video-based emergency calls at the PSAP 1 as outlined above for the illustrated example, the ML classifier 5 will identify which streams refer on the same emergency incident. The call takers 3, 3', 3", 3''' handling these video streams 4, 4', 4", 4''', will be presented with a short clip of the most lightweight stream resources. "Lightweight" stream in this context means the most efficient stream in terms of resources, i.e., bandwidth. After that, the call takers or agents 3, 3', 3", 3''' will be in position to select if this option is better compared to the video stream they are already watching on their respective monitor or display unit. If the new lightweight stream provides the same pieces of information as to the handling of the emergency incident, a selection may be made by the respective agent or call taker which video stream he or she would like to use for handling or further processing the emergency incident. This selection may also be presented to the other call takers or agents who handle the same emergency incident. After this, all of the call takers 3, 3', 3", 3''' will be in a position to verify which video stream 4, 4', 4", 4''' they want to use for handling and further processing the emergency incident.

In the example depicted in FIG. 2, the ML classifier 5, after tracking similarity between, for example, the video streams 4, 4', and 4''', wherein the most efficient stream in terms of resources (bandwidth) is determined and forwarded to the call takers 3, 3', 3'''. In this case, the most efficient stream is the one that uses codecA for the video stream. The respective audio streams remain intact.

Figure 3:
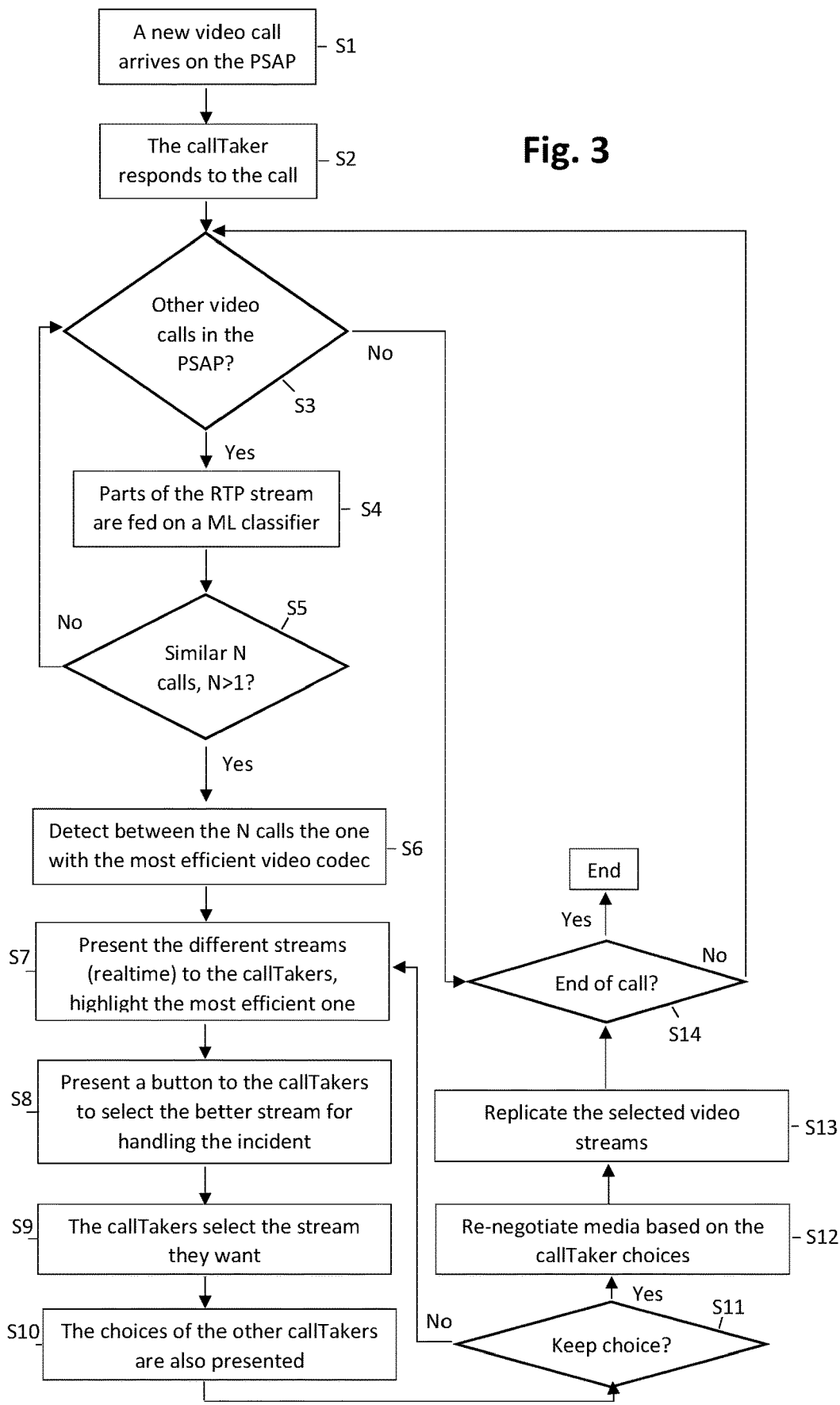
FIG. 3 shows a flow chart of the procedure of the method of processing an emergency incident according to an embodiment of the invention.

FIG. 3 shows a flow chart of the procedure of the method of processing an emergency incident according to an embodiment of the invention. Here, in the first step S1, a new emergency call comprising video data arrives at the PSAP 1. In the second step S2, the call taker responds to the emergency call. Then, in step S3, a check is carried out for identifying whether other video calls have been received at the PSAP 1 within the predetermined time period. If other calls have been received at the PSAP 1, then, in step S4, parts of the Real Time Protocol, RTP, stream of the current call comprising the video data and the other calls are fed to the ML classifier, 5 assuming that all calls refer to the same vicinity, i.e. geolocation. In the next step S5, a check is performed for determining, if there is at least one more similar emergency call. If at least one similar emergency call exists in the PSAP 1, in step S6, a check is performed for identifying which one of the calls received has the most efficient video stream in terms of bandwidth usage ("lightweight" codec). In step S7, the call takers of all similar calls (i.e., handling the same emergency incident) are presented with parts of the RTP streams of the available options. That is, they are presented together with the current stream, the one which corresponds to the active call they are already handling, and the most "lightweight" one. In step S8, a button is provided that enables the call takers to select which stream it is better for them in order to continue handling the emergency incident. In step S9, the call takers select the stream that fits better for the handling of the emergency incident. In step S10, the choices of each call taker as to the stream they have selected, is presented to the rest of the call takers. This is done with the aim to help the call takers to select the correct stream by also taking the selection of the other agents or call takers located at the PSAP 1 into account. After the choices are presented to the call takers, they are asked again, if they want to maintain their selection in step S11. Finally, in step S12, each one of the call takers who selected to switch over to the most lightweight video stream receives a re-negotiation message. The option for re-negotiation relates to the process of converting the video-based streams to simple audio streams. At the same time, the PSAP 1 replicates the video stream of the selected stream to the rest of the call takers (Step S13). Accordingly, the call takers are in position to switch back on the original video stream at any point of time during the handling and processing of the emergency call.

It is noted that the comparison between the RTP stream and the videos or images may be done using ML-based frameworks. Such comparisons can be accomplished by implementing, for example, the following frameworks: Karpathy, A., Toderici, G. Shetty, S. Leung, T., Sukthankar, R. & Fei-Fei L.: Large scale video classification with convolutional neural networks, in: Proceedings of the IEEE conference on Computer Vision and Pattern Recognition, pages 1725-1732.

FIG. 4 shows an exemplary end-to-end scenario according to still another embodiment of the invention. Here, it is assumed that four emergency callers 2, 2', 2", 2'" establish an emergency call received at the PSAP 1, using different codecs, for two different emergency incidents. The proposed method for handling and processing an emergency incident according to the embodiment detects the video stream with the minimum requirements and proposes this stream to the call takers 3, 3', 3", 3'". The latter confirm and select the most efficient stream. In this example, the second call is the most efficient one.

Here, in the example described, the first three calls are already active, and the method is applied to the fourth call. That is, in STEP1, a new video call arrives on the PSAP 1. In STEP2, the call taker 3'" responds to the call. In STEP3, a check is performed whether other active emergency video calls have been received at the PSAP 1. The same vicinity (geolocation) is considered in order to filter the different calls. Thus, only the calls from the same vicinity (geolocation, cell ID) are considered. In STEP4, parts of the video streams from the active calls and the examined call are fed into an ML classifier 5, in order to identify if there is a similarity between the calls. In STEP5, a match is found for the fourth call number initiated by the caller 2'", and the calls initiated by the callers 2, 2'. These calls refer on the first emergency incident. Thus, the ML classifier 5 returns a positive result regarding the similarity of the first, second, and fourth calls. In STEP6, a check is performed in order to identify which ones of these calls require the minimum resources. In the current scenario, the most efficient stream corresponds to the second call made by the caller 2'. After this, the stream representing the most efficient call is presented to the call takers who handle the same incident. In this scenario, the stream of the second call made by the caller 2' will be presented to callTaker1 indicated by reference numeral 3, callTaker2 indicated by reference numeral 3'; and the callTaker4 indicated by reference numeral 3'". In STEP7, an option is displayed on the monitor of the previously mentioned call takers 3, 3', 3'": "Which one is the best stream for you?" In STEP8, the different selections are returned to the PSAP 1. In STEP9, the selection of every call taker is presented to the rest of the call takers who handle the same emergency incident.

For example, that callTaker1, is presented with the current stream of the active call, and the stream of call2 (only the video part of the most efficient stream). CallTaker2, is presented with the current stream of the active call. Additionally, an indication is appeared on her monitor which indicates that currently this is the most efficient stream among the similar calls in the PSAP element. CallTaker4 is presented with the current stream of the active video call which also handles the stream of call2. Having the previous parameters in mind, it is assumed that in STEP8, the callTaker1 indicated by reference numeral 3 selects the stream of call2 initiated by the caller 2'. The callTaker2 indicated by reference numeral 3 maintains the same video stream, and the callTaker4 indicated by reference numeral 3'" also selects the stream of call2 initiated by the caller 2'. Thereafter, in STEP10, the various selections are presented to every call taker 3, 3', 3", 3'". For example, callTaker1 indicated by reference numeral 3 is presented with the selection of callTaker2 indicated by reference numeral 3' (i.e., preserves the stream of call2 imitated by the caller 2') and callTaker4 indicated by reference numeral 3'" (i.e., selects the stream of call2 imitated by the caller 2'). This is done in order to help the call takers identify which are the different selections with regards to the specific emergency incident. Thus, in STEP11, a button is displayed at the respective display (not shown) at each call taker 3, 3', 3", 3'" in order to verify his or her selection. In STEP12, callTaker1 indicated by reference numeral 3 and callTaker4 indicated by reference numeral 3'" verify that they want to switch to the stream that is generated from call2 initiated by the caller 2'.

The previous selection generates re-INVITE messages for the emergency callers 2 and 2'" that aim at switching the video-calls to simple audio calls. If the re-negotiation completes successfully, then the video stream is replicated on the callTaker1 indicated by reference numeral 3 and callTaker4 indicated by reference numeral 3'.

The stream between the emergency caller2 indicated by reference numeral 2' and the callTaker2 indicated by reference numeral 3' is remained intact. On the contrary, the streams between the emergency caller1 indicated by reference numeral 2 and callTaker1 indicated by reference numeral 3 and the emergency caller4 indicated by reference numeral 2'" and callTaker4 indicated by reference numeral 3' are converted to simple audio streams. The call takers of the first call initiated by the caller 2 and the fourth call initiated by the caller 2' are presented with the same video stream that is also presented to callTaker2 indicated by reference numeral 2'.

It should be appreciated that different embodiments of the method, system, a PSAP, and an apparatus can be developed to meet different sets of design criteria. For example, the particular type of network connection, server configuration or client configuration for a device for use in embodiments of the method can be adapted to account for different sets of design criteria. As yet another example, it is contemplated that a particular feature described, either individually or as part of an embodiment, can be combined with other individually described features, or parts of other embodiments. The elements and acts of the various embodiments described herein can therefore be combined to provide further embodiments. Thus, while certain exemplary embodiments of a telecommunication apparatus, telecommunication device, terminal device, a network, a server, a communication system, and methods of making and using the same have been shown and described above, it is to be distinctly understood that the invention is not limited thereto but may be otherwise variously embodied and practiced within the scope of the following claims.

What is claimed is:

1. A computer-implemented method of processing an emergency incident reported to a public-safety answering point (PSAP) by a plurality of callers, the method comprising:
   receiving, at the PSAP, a video call for reporting an emergency incident at a specified location;
   checking, at the PSAP, if further video calls have been received from the same specified location within a predetermined time period, and if it is determined that there are further video calls that have been received at the PSAP for the same specified location within the predetermined time period, feeding at least a part of the video call and the further video calls to a ML classifier unit,
   identifying, at the ML classifier unit, if there are similarities between the video call and the further video calls, and if it is determined that there exists similarity between the video call and at least one further video call,
   determining which one of the video calls that have been determined to be similar uses less bandwidth; and
   transmitting the determined one of the video calls that uses less bandwidth to at least one call taker that handles the emergency incident at the PSAP.

2. The method of claim 1, wherein the video call and the further video calls use different audio and/or video codec.

3. The method of claim 1, wherein the video call that has been determined to use less bandwidth is transmitted to at least one call taker that handles the emergency incident at the PSAP such that the transmitted video call that has been determined to use less bandwidth is displayed at a display unit of the at least one call taker.

4. The method of claim 3, comprising:
   providing, to the at least one call taker that handles the emergency incident at the PSAP, a button for selecting a video stream to be used for further handling the emergency incident.

5. The method of claim 4, comprising:
   presenting the selection of the at least one call taker that handles the emergency incident at the PSAP to other call takers at the PSAP that handle the emergency incident.

6. The method of claim 1, comprising:
   generating at least one re-INVITE message to the emergency callers of the plurality of the emergency callers who select to switch from video call to audio call.

7. The method of claim 6, comprising:
   converting one or more of the video calls to audio calls for the one or more callers who selected a switch from video call to audio call.

8. A method of claim 7, comprising:
   replicating the selected video stream to all call takers at the PSAP that handle the emergency incident.

9. A computer-implemented method of processing an emergency incident reported to a public-safety answering point (PSAP) by a plurality of callers, the method comprising:
   receiving, at the PSAP, a video call for reporting an emergency incident at a specified location;
   checking, at the PSAP, if further video calls have been received from the same specified location within a predetermined time period, and if it is determined that there are further video calls that have been received at the PSAP for the same specified location within the predetermined time period, feeding at least a part of the video call and the further video calls to a ML classifier unit,
   identifying, at the ML classifier unit, if there are similarities between the video call and the further video calls, and if it is determined that there exists similarity between the video call and at least one further video call, and
   determining which one of the video calls that have been determined to be similar uses less bandwidth;
   wherein the ML classifier unit uses a stream replication technique for determining similarity between the video streams.

10. The method of claim 9, wherein the video call and the further video calls use different audio and/or video codec.

11. The method of claim 9, comprising:
    transmitting the video call that has been determined to use less bandwidth to at least one call taker that handles the emergency incident at the PSAP and is displayed at a display unit of the at least one call taker.

12. The method of claim 11, comprising:
    providing, to the at least one call taker that handles the emergency incident at the PSAP, a button for selecting a video stream to be used for further handling the emergency incident.

13. The method of claim 12, comprising:
    presenting the selection of the at least one call taker that handles the emergency incident at the PSAP to other call takers at the PSAP that handle the emergency incident.

14. The method of claim 9, comprising:
    generating at least one re-INVITE message to the emergency callers of the plurality of the emergency callers who select to switch from video call to audio call.

15. The method of claim 14, comprising:
    converting one or more of the video calls to audio calls for the one or more callers who selected a switch from video call to audio call.

16. The method of claim 15, comprising:
    replicating the selected video stream to all call takers at the PSAP that handle the emergency incident.

17. An emergency communication apparatus comprising:
    at least one public-safety answering point (PSAP) for handling at least one emergency incident, the PSAP comprising a processor connected to a non-transitory computer readable medium and at least one transceiver, the PSAP configure to implement a method comprising:
    receiving, at the PSAP, a video call for reporting an emergency incident at a specified location;
    checking, at the PSAP, if further video calls have been received from the same specified location within a predetermined time period, and if it is determined that there are further video calls that have been received at the PSAP for the same specified location within the predetermined time period, feeding at least a part of the video call and the further video calls to a ML classifier unit,
    identifying, at the ML classifier unit, if there are similarities between the video call and the further video calls, and if it is determined that there exists similarity between the video call and at least one further video call,
    determining which one of the video calls that have been determined to be similar uses less bandwidth; and transmitting the determined one of the video calls that uses less bandwidth to at least one call taker that handles the emergency incident at the PSAP.

18. The emergency communication apparatus of claim 17, wherein the apparatus is a network.

19. The emergency communication apparatus of claim 17, wherein the ML classifier unit is configured to use a stream replication technique for determining similarity between the video streams.

\* \* \* \* \*